(12) United States Patent
Herbener (10) Patent No.: US 10,483,889 B2
(45) Date of Patent: Nov. 19, 2019

(54) OPERATION OF A LOCAL ALTERNATING CURRENT NETWORK WITH A GENSET AND A UPS

(71) Applicant: Piller Group GmbH, Osterode am Harz (DE)

(72) Inventor: Frank Herbener, Bad Grund (DE)

(73) Assignee: PILLER GROUP GMBH, Osterode am Harz (DE)

(*) Notice: Subject to any disclaimer, the term of this patent is extended or adjusted under 35 U.S.C. 154(b) by 202 days.

(21) Appl. No.: 15/814,806

(22) Filed: Nov. 16, 2017

(65) Prior Publication Data

US 2018/0076661 A1 Mar. 15, 2018

Related U.S. Application Data

(63) Continuation of application No. PCT/EP2016/060829, filed on May 13, 2016.

(30) Foreign Application Priority Data

May 19, 2015 (EP) .................................... 15168264

(51) Int. Cl.
*H02P 9/00* (2006.01)
*H02P 9/02* (2006.01)
(Continued)

(52) U.S. Cl.
CPC ............... *H02P 9/02* (2013.01); *H02J 3/24* (2013.01); *H02J 3/381* (2013.01); *H02J 9/062* (2013.01);
(Continued)

(58) Field of Classification Search
CPC ...... H02P 9/00; H02P 9/02; H02P 9/04; H02P 9/44
(Continued)

(56) References Cited

U.S. PATENT DOCUMENTS

| 7,825,541 B2 | 11/2010 | Herbener | |
|---|---|---|---|
| 2011/0216562 A1* | 9/2011 | Gengenbach | H02J 3/18 363/71 |
| 2016/0359328 A1* | 12/2016 | Hunt | H02J 3/32 |

FOREIGN PATENT DOCUMENTS

WO    2008/135549 A2    11/2008

OTHER PUBLICATIONS

PCT International Preliminary Report on Patentability in co-pending, related PCT Application No. PCT/EP2016/060829, dated Nov. 21, 2017.

* cited by examiner

*Primary Examiner* — Adi Amrany
(74) *Attorney, Agent, or Firm* — Thomas | Horstemeyer, LLP (57) ABSTRACT

A frequency of an AC voltage of an AC grid present at a genset is defined by an UPS. The frequency is altered in one direction away from a desired frequency, if a power demand increases beyond a power supply in the AC grid, and in the other direction, if the power demand falls below the power supply. An alteration of the frequency in the one direction is limited to a maximum value in that missing power is temporarily fed out of an energy storage of the UPS into the AC grid. A shift of the frequency in the one direction is kept until no more power flows out of the energy storage. The genset responds to deviations of the frequency of the AC voltage from the desired frequency in the one and the other direction by an increase and a decrease of supplied genset power, respectively.

20 Claims, 6 Drawing Sheets

(51) Int. Cl.
- *H02P 9/44* (2006.01)
- *H02P 9/04* (2006.01)
- *H02J 9/06* (2006.01)
- *H02J 3/38* (2006.01)
- *H02J 3/24* (2006.01)

(52) U.S. Cl.
CPC ............ *H02J 9/066* (2013.01); *H02P 9/00* (2013.01); *H02P 9/04* (2013.01); *H02P 9/44* (2013.01)

(58) Field of Classification Search
USPC .......................................................... 307/153
See application file for complete search history.

OPERATION OF A LOCAL ALTERNATING CURRENT NETWORK WITH A GENSET AND A UPS

CROSS REFERENCE TO RELATED APPLICATIONS

This application is a continuation of International Application PCT/EP2016/060829 with an international Filing Date of May 13, 2016 and claiming priority to European Patent Application No. EP 15 168 264.8 entitled "Operation of a Local Alternating Current Network with a Genset and a UPS", filed on May 19, 2015, to which European Patent EP 3 096 434 B1 has been granted on Aug. 16, 2017.

FIELD

The invention relates to a method of operating a local AC power grid comprising a genset which includes a combustion engine and a generator, and an uninterruptible power supply (UPS) which includes an energy storage. Further, the invention relates to a UPS for carrying out such a method, comprising an energy storage and a controller.

The inventions does not relate to bridging the period of time which is needed for starting the combustion engine of the genset by means of the UPS. Such a method of starting a genset may be combined with the method according to the invention. The method according to the invention, however, starts from an already started genset.

In the method according to the invention, the local AC power grid is not connected to a higher-level supply grid that determines a frequency of an alternative voltage of the AC power grid.

The method according the invention may not only be carried out for a temporary emergency operation of a local AC power grid which is regularly supplied out of a higher-level supply grid, i.e. upon blackout of the higher-level supply grid, but also for operating a local AC power grid as an island grid in which the genset is provided for a permanent power supply.

BACKGROUND

The combination of a UPS comprising an energy storage and a genset comprising a combustion engine and a generator is known to ensure a long-term emergency power supply for a local AC power grid which is normally supplied out of a higher-level supply grid. The energy storage of the UPS may, for example, comprise a battery, a flywheel coupled to an electric machine or any other energy storage available at short notice for storing energy. By means of this energy, the local AC power grid is supplied in case of a blackout of the higher level supply grid until the combustion engine of the genset has been started up and overtakes the power supply. Thus, an intermediate drop of the AC voltage of the local AC power grid is avoided.

A known method called droop serves for coordinating the powers supplied by individual AC power sources to a local AC power grid while the AC power grid is disconnected from a higher-level supply grid or the AC power grid is an island grid. In each AC power source, a desired value for the frequency of the AC voltage which is provided in the local AC power grid by all AC power sources together is determined based on a characteristic which decreases with the power presently supplied by the AC power source. As an actual value, the actual frequency of the AC voltage of the local AC power grid is compared to this desired value. If the desired value determined for the respective AC power source is above the actual value, the power supplied to the local AC power grid by the AC power source is increased due to the attempt to increase the actual value of the frequency up to the desired value. Due to the decreasing frequency-power-characteristic, the increase of power from the respective AC power source associated with the attempt to increase the frequency simultaneously results in a decrease of the desired value of the frequency. In this way, the AC power source approaches a power demanded by the local AC power grid from below. Correspondingly, an AC power source which, at the beginning, supplied more than an average power to the local AC power grid approaches the demanded power from above. With equal characteristics with regard to the relative capacities of the individual AC power sources, all AC power sources are adjusted to an equal degree of capacity utilization. If, however, the power demanded by the local AC power grid varies strongly, at first strong variations of the frequency of the AC voltage of the local AC power grid result until the powers of all connected AC power sources have been adjusted. The frequency variations may reach such an extent that an emergency shut-off of AC power sources occurs, if they are, for example, made as gensets. Further, the frequency variations of the AC voltage in the local AC power grid may be critical for the connected loads. This particularly applies if they are sensitive loads, like, for example, computer systems or communication equipment.

Even if a UPS comprising an energy storage is connected to the local AC power grid in addition to the gensets, when carrying out the known droop method, the frequency of the AC voltage of the AC power grid is determined by the gensets according to their cooperating decreasing frequency-power-characteristics. In this case, the UPS compensates for short-term variations of the power demand of the AC power grid by feeding power out of its or accepting power in its energy storage.

Further, the use of a frequency-power-characteristic decreasing with the actually supplied power is known for adjusting a desired constant feeding power of an AC power source, for example a diesel generator, in an interconnected power grid having a fixed frequency of its AC voltage. For this purpose, the frequency-power-characteristic is parallel translated in the AC power source until the characteristic gives the desired power at the fixed frequency.

There still is a need of a method of operating a local AC power grid comprising a genset which includes a combustion engine and a generator, and an uninterruptible power supply (UPS) which includes an energy storage, and a UPS suitable for carrying out such a method, comprising an energy storage and a controller, by which a cooperation of the UPS with the genset also connected to the local AC power grid is ensured for stabilizing the frequency of the AC voltage of the local AC power grid, without a direct communication between these two units being necessary.

SUMMARY OF THE INVENTION

The present invention relates to a method of operating a local AC power grid comprising a genset which includes a combustion engine and a generator, and an uninterruptable power supply (UPS) which includes an energy storage. The method comprises defining a frequency of an AC voltage of the AC power grid present at the genset by means of the UPS, and altering the frequency of the AC voltage defined by means of the UPS in one direction away from a desired frequency, if a present power demand in the AC power grid increases beyond a present power supply in the AC power grid; and altering the frequency of the AC voltage defined by means of the UPS in the other direction away from the desired frequency, if the present power demand falls below the present power supply in the AC power grid. The method further comprises, with increasing power demand of the AC power grid, limiting an alteration of the frequency of the AC voltage defined by means of the UPS in the one direction to a maximum value in that missing power is temporarily fed out of the energy storage into the AC power grid; keeping a shift of the frequency of the AC voltage defined by means of the UPS in the one direction away from the desired frequency until no more power flows out of the energy storage into the AC power grid; and responding to deviations of the frequency of the AC voltage of the AC power grid from the desired frequency in one direction by an increase of a power supplied by means of the genset, and responding to deviations of the frequency of the AC voltage of the AC power grid from the desired frequency in the other direction by a reduction of the power supplied by means of the genset.

Further, the present invention relates to an uninterruptable power supply (UPS) for operating a local AC power grid which, besides the UPS, comprises a genset including a combustion engine and a generator. The UPS comprises an energy storage, at least one connection for integrating the UPS in the AC power grid and for connecting the genset to the UPS, and a controller. The controller is configured to control the UPS such that the UPS defines a frequency of an AC voltage of the AC power grid, which is present at the connection for the genset, alters the frequency of the AC voltage in one direction from a desired frequency of the AC voltage, if a present power demand in the AC power grid increases beyond a present power supply in the AC power grid, and alters the frequency of the AC voltage in the other direction, if the present power demand falls below the present power supply in the AC power grid. Further, the controller is configured to limit the alteration of the frequency of the AC voltage in the one direction to a maximum value, when the power demand of the AC power grid increases, in that it controls the UPS such that the UPS temporarily feeds missing power out of the energy storage into the AC power grid. The controller is also configured to control the UPS such that the UPS keeps the frequency of the AC voltage shifted with regard to the desired frequency in the one direction away from the desired frequency until no more power flows out of the energy storage into the AC power grid.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

In a method according to the invention of operating a local AC power grid comprising a genset which includes a combustion engine and a generator, and an uninterruptible power supply (UPS) which includes an energy storage, the genset is regulated to a desired frequency in that, by means of the genset, it is responded to deviations of a frequency of an AC voltage of the AC power grid from the desired frequency in one direction by an increase of power and in the other direction by a reduction of power. The frequency of the AC voltage of the AC power grid present at the genset is defined by means of the UPS. If a present power demand increases beyond a present power supply in the AC power grid, the frequency of the AC voltage defined by means of the UPS is altered away from a desired frequency of the AC voltage in one direction. Typically, this alteration is made towards lower frequencies. If the present power demand decreases beyond the present power supply in the AC power grid, the frequency of the AC voltage defined by the UPS is, on the other hand, altered away from the desired frequency of the AC voltage in the other direction, i.e. towards higher frequencies in the regular case. In case of an increase of the power demand of the AC power grid, the alteration of the frequency of the AC voltage defined by the UPS is limited to a maximum value in the one direction in that missing power is temporarily fed out of the energy storage into the AC power grid. Afterwards, the frequency of the AC voltage defined by the UPS remains shifted with regard to the desired frequency in the one direction at least until no more power flows out of the energy storage into the AC power grid. During this time the genset is continuously regulated to the desired frequency.

In the method according to the invention, the UPS defines the frequency of the AC voltage of the AC power grid, which is present at the genset. In defining the frequency, the UPS holds off stronger increases of the power demand with regard to the alterations of the frequency resulting therefrom to a high extent. Thus, even load leaps in the AC power grid only have the effect of a gradual increase of the load on the genset, and particularly no such high frequency variations of the AC voltage of the local AC power grid occur that an emergency shutoff of the genset or disturbances of loads connected to the AC power grid occur. For this purpose, the UPS temporarily feeds a higher electric power out of its energy storage, i.e. at first the full difference between the power already fed by the genset up to now and the presently consumed power, into the local AC power grid, and then slowly reduces this feeding. On the other hand, the gradual alteration of the frequency of the AC voltage in the local AC power grid caused by the UPS in the one direction remains existent at least until no more power flows out of the energy storage of the UPS into the AC power grid. It may even remain beyond that point until the energy storage is recharged in the direction of its starting charge state again. Upon reaching the starting charge state, this recharging of the energy storage is terminated by a temporal shift of the frequency of the AC voltage in the local AC power grid defined by means of the UPS in the other direction to reduce the feeding of power by means of the genset to the power demand of the AC voltage grid.

The recharging of the energy storage up to its starting charge state may, however, also only occur when, in absorbing a stepwise decrease of the power demand of the AC power grid, the alteration of the frequency of the AC voltage defined by the UPS is limited to another maximum value in the other direction in that excess power is temporarily fed out of the AC power grid into the energy storage. In this case, the frequency of the AC voltage defined by the UPS afterwards remains shifted in the other direction with regard to the desired frequency at least until no more power flows out of the AC power grid into the energy storage. This additional step of the method according to the invention may, however, also be carried out starting from the starting charge state of the energy storage, if the starting charge state leaves a capacity for taking up additional energy into the energy storage.

In this case it is suitable that the frequency of the AC voltage defined by the UPS remains shifted with regard to the desired frequency in the other direction until the energy storage is again discharged in the direction of its starting charge state. This discharge may then be terminated by a temporal shift of the frequency of the AC voltage defined by the UPS with regard to the desired voltage in the one direction upon reaching the starting charge state. In this way, the energy storage is brought back into its starting charge state after each delivery of electric power out of the energy storage or taking up of electric power into the energy storage to prepare it for the next taking up or delivery of electric power.

The maximum value to which the alteration of the frequency defined by the UPS is limited in the one direction or the other maximum value to which the alteration of the frequency is limited in the other direction may define a maximum difference between the frequency and the desired frequency. For example, the alteration of the frequency defined by the UPS may be limited with regard to the desired frequency to less than 10%, particularly to not more than 5%, like for example to 4% of the desired frequency. This means that the maximum value and the other maximum value may be chosen clearly smaller than a maximum alteration of frequency which is tolerated by a commercial genset before its emergency shutoff, and which is for example about 15% of the desired frequency. Thus, by means of the method according to the invention, not only an emergency shutoff of the genset is avoided, but the frequency is additionally kept stable within narrower limits. This stability of the frequency results in a clearly lower stress of the genset due to switching on full loads and dropping loads, and protects the loads connected to the local power grid.

The maximum value and/or the other maximum value to which the alteration of the frequency defined by the UPS is limited in the one or the other direction from the desired frequency may also define a maximum rate of alteration of the frequency defined by the UPS. For example, it may define that the frequency of the AC voltage does not alter by more than 1% of the desired frequency per second in the one or the other direction. Particularly, this limit to the rate of alteration of the frequency defined by the UPS may be defined in addition to the limit to the difference between the frequency and the desired frequency by means of the maximum value and/or the other maximum value.

Except of their sign, i.e. with regard to their absolute value, all components of the maximum value to which the alteration of the frequency defined by the UPS is limited in the one direction and of the other maximum value to which the alteration of the frequency defined by the UPS is limited in the other direction may be equal, despite of their designation as the "one" and the "other" maximum value. This, however, does not need to be the case.

Particularly, the method according to the invention may be implemented in that each difference between the power demand and the power supply in the AC power grid is compensated for by the UPS by means of a transfer of power between the AC power grid and the energy storage, wherein the frequency of the AC voltage of the AC power grid defined by the UPS is adjusted to a value depending on the power flowing between the AC power grid and the energy storage. The frequency of the AC voltage of the AC power grid is defined by means of the UPS as a fixed setting. Here, the value at which the frequency of the AC power grid is held by means of the UPS depends on the absolute value and the direction of the power flowing between the AC grid and the energy storage. In the method according to the invention, however, this dependency is also limited, because the alteration of the frequency of the AC voltage in the local AC power grid is limited to the maximum value and the other maximum value, respectively. This results in a characteristic of the UPS indicating the course of the frequency defined by the UPS over the power flowing between the energy storage and the AC power grid, which has a steady course between a first plateau at a maximum value of the frequency and a plateau at a minimum value of the frequency and which is decreasing strictly monotonically. As a rule, the characteristic decreases from a power flow into the energy storage towards a power flow out of the energy storage.

The frequency-power-characteristic of the UPS in a method according to the invention differs from a frequency-power-characteristic in a droop method in that it is not tried to compensate for a difference between the frequency resulting from the characteristic and the actual frequency of the AC voltage of the AC power grid but that the frequency of the AC voltage of the AC power grid is fixedly defined by the UPS depending on the power flowing between the energy storage and the AC power grid. Here, the power may both flow out of the energy storage and into the energy storage, i.e. the power of the UPS may not just be positive but also be negative. Further, in a method according to the invention, the frequency-power-characteristic of the UPS has the two plateaus at the two ends of the characteristic which are not present in a frequency-power-characteristic in a droop method.

At a power flow of zero, the frequency-power-characteristic of the UPS indicates the desired frequency. Generally, this desired frequency is the nominal frequency of the AC power grid, i.e. 50 Hz in Central Europe, and thus fixed. However, it is also within the scope of the present invention that several gensets connected to the AC power grid distribute the power demand of the AC power grid among each other according to a droop method. Then, for example, the frequency which results from the flatly decreasing frequency-power-characteristic of the gensets with this distribution of the present power demand of the AC power grid is the desired frequency. This desired frequency may be calculated from the UPS from the power demand of the AC power grid and the decreasing frequency-power-characteristic of the gensets or empirically be determined from the frequency behavior of the AC power grid. Then, the frequency-power-characteristic of the UPS may be shifted in such a way that it indicates the presently desired frequency at the power flow of zero.

The frequency of the AC voltage of the AC power grid which is defined by the UPS may—besides the dependency on power flowing between the energy storage and the AC power grid represented by the frequency-power-characteristic—also depend on a difference between a charge state of the energy storage and its starting charge state to always reach this starting charge state within short time again, because this is a precondition for being able to both deliver energy out of the energy storage and receive energy in the energy storage.

In the method according to the invention, a desired power value for the energy storage may particularly be combined of two signals: an output signal of a frequency regulator of the UPS which is dominant for the desired power value, and an output signal of a charging regulator of the energy storage aiming for bringing the charge state of the energy storage back to the desired starting charge state again. Here, it proved to be practical to only use the output signal of the frequency regulator as a power value for the frequency-power-characteristic. If the output signal of the charging regulator then indicates that the energy storage should be charged, the power reception of the energy storage results in a small decrease of the frequency of the AC voltage of the AC power grid to which the frequency regulator responds with its output signal to compensate for this drop in frequency. Via the frequency-power-characteristic, the altered output signal of the frequency regulator then results in that the UPS defines a lower frequency, and the gensets correspondingly deliver more power so that, once the frequency corresponds to the desired frequency again, the energy storage is charged.

In a UPS according to the invention, the controller is made such that it carries out the method according to the invention. If a plurality of parallel connected UPSs with energy storages are present, they may be provided with a common controller which adapts the powers of the individual UPS with regard to each other, i.e. synchronizes the individual USPs in respect of their power delivery or power reception with regard to each other. This, however, is not necessary. Instead, same frequency-power-characteristics of the individual USPs are sufficient to coordinate their power deliveries and power receptions. This even applies if several UPSs together with one or more gensets are connected to the same AC power grid at their input side but to otherwise separated partial grids at their output side. If a load step in one partial grid is then absorbed by the associated UPS, the other UPSs are engaged in this absorption via the common input side AC power grid as they act against the alteration of the frequency of the AC power grid by the associated UPS by means of feeding electric power out of their energy storages or receiving electric energy in their energy storages. In this way, the power missing or being excessive in all partial grids connected to the AC power grid via the UPSs is distributed over the totality of the UPSs.

For the operation of the one or the plurality of UPS(s) it is insignificant whether one or more gensets are connected to the local power grid. The operation of the UPSs according to the method according to the invention does also not depend on how the gensets are connected to the local power grid. They may, for example, be connected to the AC power grid parallel to the UPS(s) and the loads. Here, the UPS may be connected between a higher-level supply grid and the actual local AC power grid, wherein a disconnector is provided for separating the UPS from the higher-level supply grid at its input side. Alternatively, the genset(s) may be arranged at the input side of one or more UPS(s) opposite to the loads to be supplied, and in this way upstream of the UPS(s). Then, upon blackout of the higher-level supply grid, the input side of the UPS(s) is switched over from the higher-level supply grid to the gensets.

The UPS(s) as so-called online UPSs may galvanically separate the loads to be supplied from the upstream gensets. This has no influence on the method according to the invention as long as the AC voltage at the input side of the UPSs has the same frequency as at the output side of the UPSs. In so-called double conversion UPSs which define a frequency of their output side AC voltage independently from a frequency of their input side AC voltage, the frequency of that AC voltage is decisive for the present invention which is also present at the genset(s). As the genset(s) is/are suitably arranged upstream of double conversion UPSs, typically, the frequency of the input side AC voltage is defined according to the invention by the double conversion UPS(s).

In this application, the term "AC power grid" generally designates the totality of any partial grids connected with regard to their power via the UPSs, to which the genset(s) are connected, on the one hand, and the supplied loads are connected, on the other hand. The frequency of the AC voltage which, according to the invention, is defined by the UPS(s) is always that one of the partial grids to which the genset(s) are connected. The UPS(s) may additionally also define another, preferably constant frequency of another AC voltage of another partial grid of the AC voltage grid, to which the loads are connected.

The energy storage of the UPS is not necessarily a quick energy storage, i.e. such an energy storage that allows for a quick transfer of electric energy, i.e. short-term taking out and feeding in high powers. The requirements to be fulfilled by the energy storage are not different to those which otherwise apply to the energy storage of an UPS. The energy storage may, for example, comprise a battery, inclusive of a capacitor bank, or a flywheel coupled to a rotor of an electric machine, wherein this electric machine is part of the UPS. Independently from the construction of the energy storage, the UPS may be designed as a so-called rotating UPS or a so-called static UPS.

In a particular embodiment of the UPS according to the invention, its controller has a frequency regulator for the frequency of the AC voltage of the AC power grid defined by the UPS which is present at the connector for the genset, wherein the frequency regulator outputs a first desired power partial signal. Further, the controller has a charging regulator for keeping a predetermined charge state of the energy storage, wherein the charging regulator outputs a second desired power partial signal. Here, a time constant of the charging regulator is higher than a time constant of the frequency regulator so that the frequency regulator is dominant over the charging regulator. An adder of the controller adds the first desired power partial signal and the second desired power partial signal to form a desired power partial signal for the energy storage; and a frequency adjuster for adjusting the desired frequency does this on the basis of the first desired power partial signal only, typically applying the characteristic already commented on.

Figure 1:
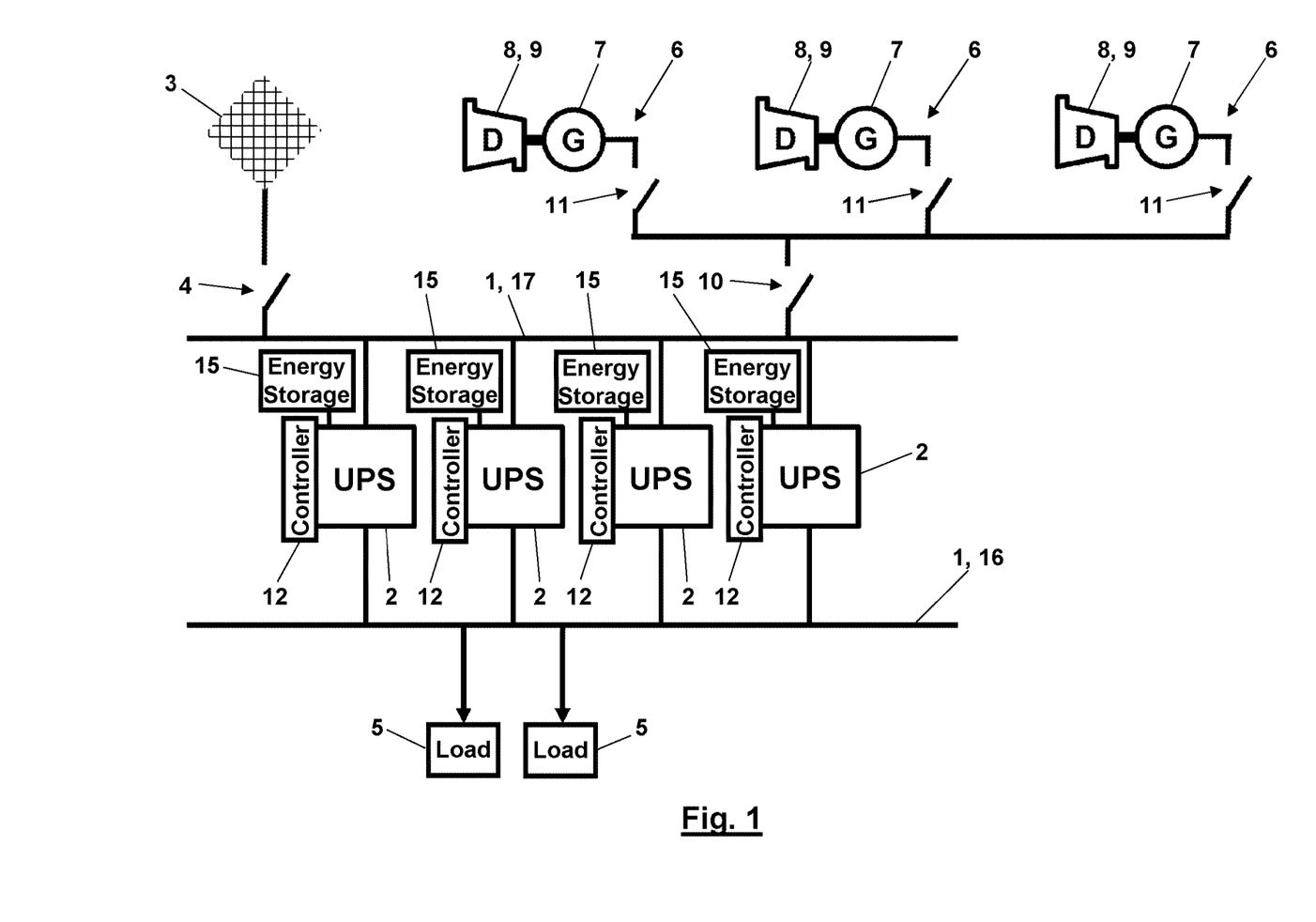
FIG. 1 outlines a local AC power grid comprising parallel connected UPSs which are connected to a higher-level supply grid, wherein the UPSs, upon blackout of the higher-level supply grid, are fed out of gensets also at the input side.

Now referring in greater detail to the drawings, FIG. 1 shows a local AC power grid 1 to which a higher-level supply grid 3 is connected. A disconnector 4 is provided to disconnect the AC power grid 1 from the supply grid 3 upon blackout of the supply grid 3. The AC power grid 1 is subdivided into a partial grid 16 and a partial grid 17 which are connected via a plurality of parallel connected UPSs 2. Each of the UPSs 2 includes an energy storage 15. Loads 5 to be supplied are connected to the partial grid 16. The partial grid 17 is connected to the supply grid 3 via the disconnector 4 and to a plurality of gensets 6 via a further switch 10. The gensets 6 are provided for substitute supply of the loads 5, if the supply grid brakes down. Each of the gensets 6 includes a generator 7 and a combustion engine 8 made as a diesel motor 9. After opening the disconnector 4, the gensets 6 are connected to the UPSs 2 via the switch 10, wherein an additional disconnector 11 is assigned to each genset 6. According to FIG. 1, the gensets 6 are arranged on the same side of the UPSs as the supply grid 3, i.e. they are connected to the same partial grid 17 and thus arranged upstream of the UPSs 2 with regard to the partial grid 16 to which the loads 5 are connected. Each of the parallel connected UPSs 2 is provided with a controller 12 whose function will be further explained with reference to FIGS. 3 to 5. The gensets 6 are individually regulated to a desired frequency which is the same for all gensets 6, wherein they increase the power delivered by them, if the frequency of the AC voltage of the partial grid 17, which is defined by the UPSs 2 and which is present at their respective outputs, is below the desired frequency. If the frequency of this AC voltage of the partial grid 17 is above the desired frequency, the respective genset 6, on the other hand, reduces the power delivered by it. The frequency of the AC voltage of the partial grid 16 can be defined by the UPSs 2 independently from the frequency of the AC voltage of the partial grid 17, if they are made as double conversion UPSs.

Figure 2:
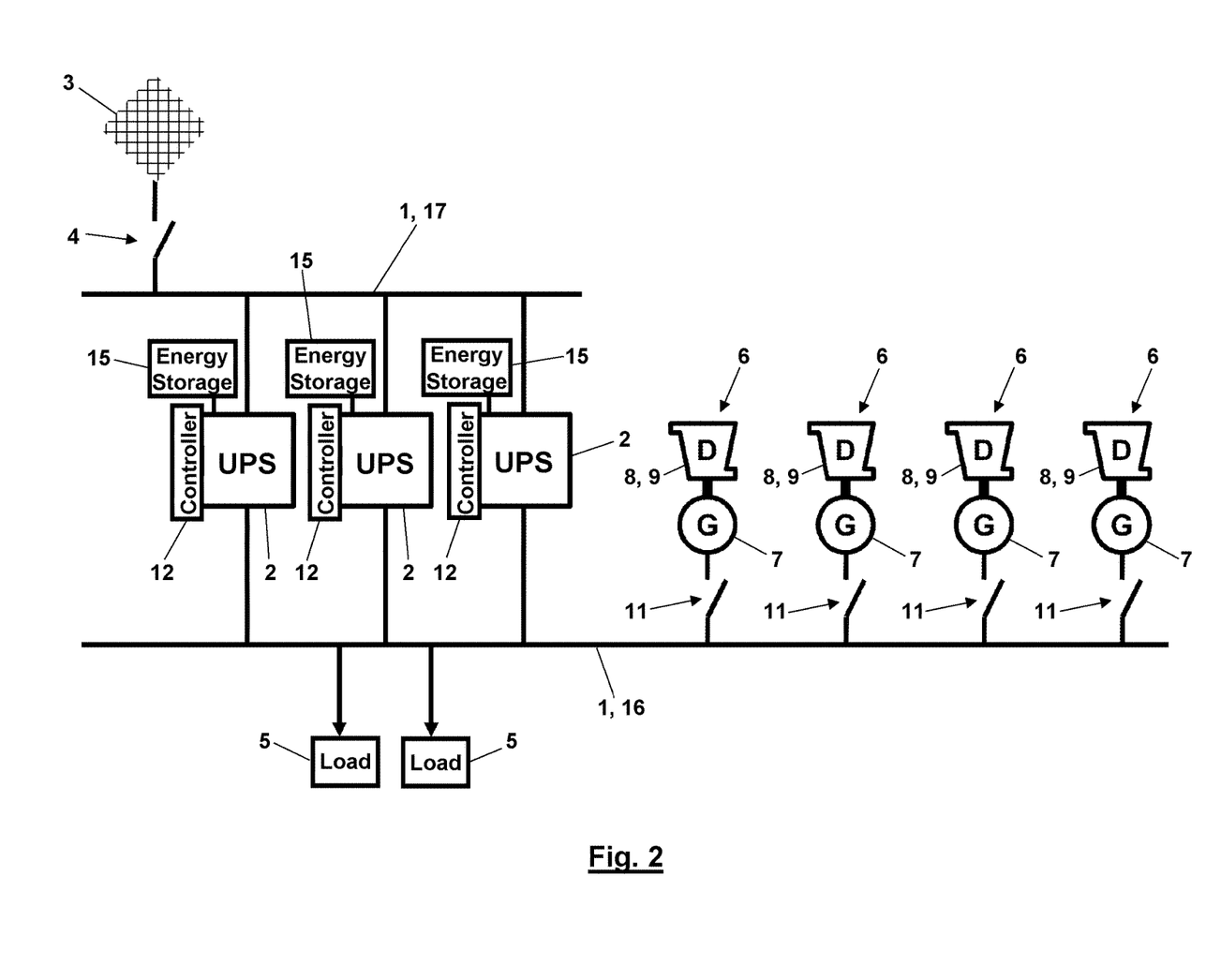
FIG. 2 shows a local AC power grid which is connected to a higher-level supply grid via parallel connected UPSs, wherein a plurality of gensets is directly connected to the local AC power grid to supply it with electric power in case of a blackout of the higher-level supply grid.

FIG. 2 shows another arrangement of the gensets 6 than FIG. 1. According to FIG. 2, the gensets 6 are not arranged upstream of the UPSs 2, but each of them, via its disconnectors 11, is connected to the same partial grid 16 of the AC power grid 1 as the loads 5 on the load side of the UPSs. Here as well, the controllers 12 operate the UPSs 2; and the gensets 6 are regulated to the desired frequency each separately and independently from the controllers 12 and from each other, as it has been described in the context of FIG. 1. However, the frequency of the AC voltage of the AC power grid 1, which is defined by the UPSs 2 and which is the basis of the regulation of the genset, is that one of the partial grid 16.

Whereas FIGS. 1 and 2 each show a basic supply of the local AC power grid 1 by the higher-level supply grid 3, the local AC power grid 1 may also be an island grid which gets its basic supply from the gensets 6. In each case, the gensets 6 are stabilized during their operation to feed electric power into the AC power grid 1 according to the invention with the aid of the UPSs 2 as it will be now explained in detail.

Figure 3:
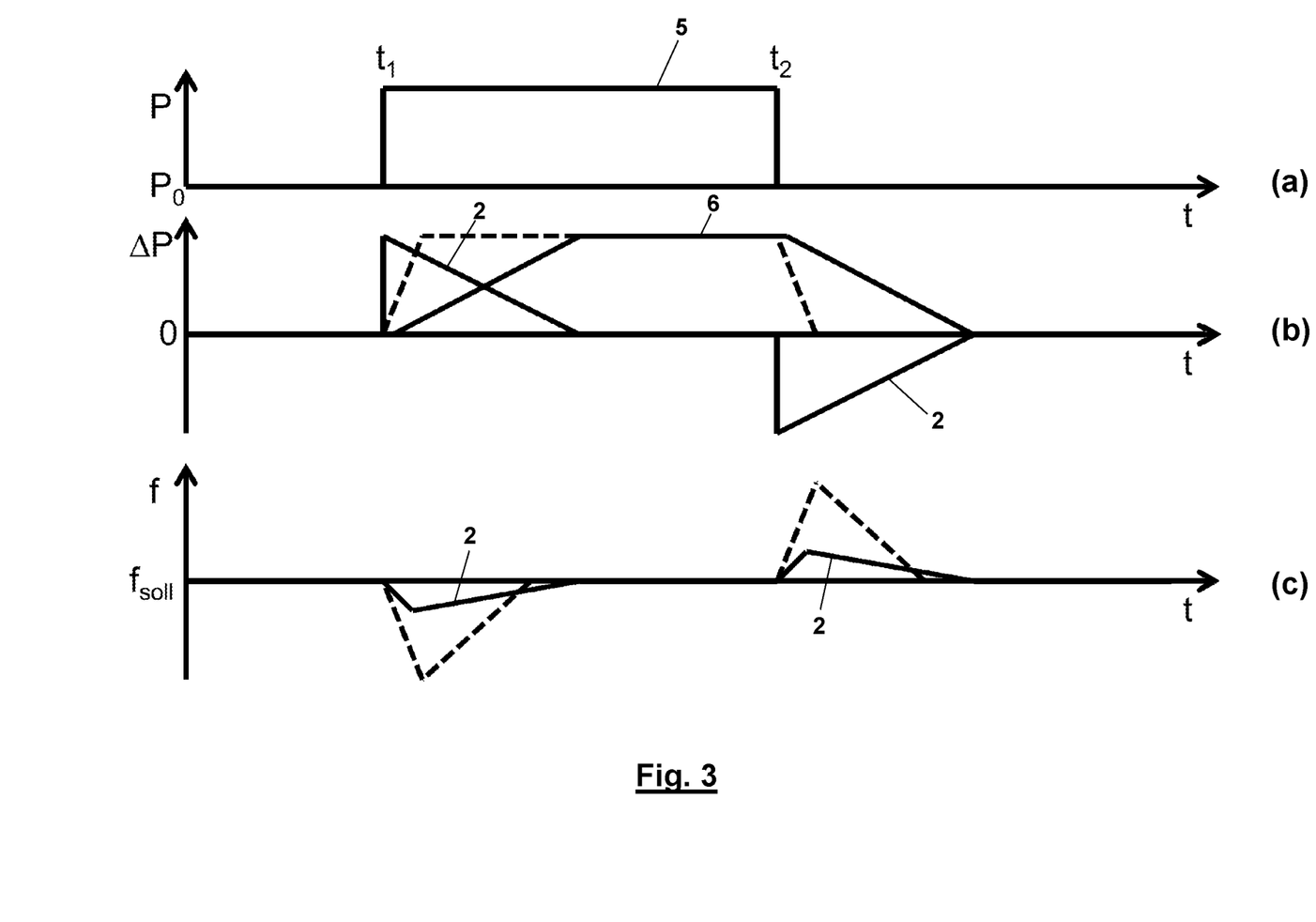
FIG. 3 shows (a) connecting a load to the local AC power grid according to FIG. 1 or FIG. 2; (b) the change of power of the UPSs and the gensets due to the connection of the power according to (a) in the method according to the invention, wherein the alteration of the power of the gensets without the method according to the invention is plotted with a dashed line; and (c) the resulting alteration of the frequency of the AC voltage of the AC power grid in the method according to the invention, wherein the frequency alteration without the method according to the invention is plotted with a dashed line.
Figure 4:
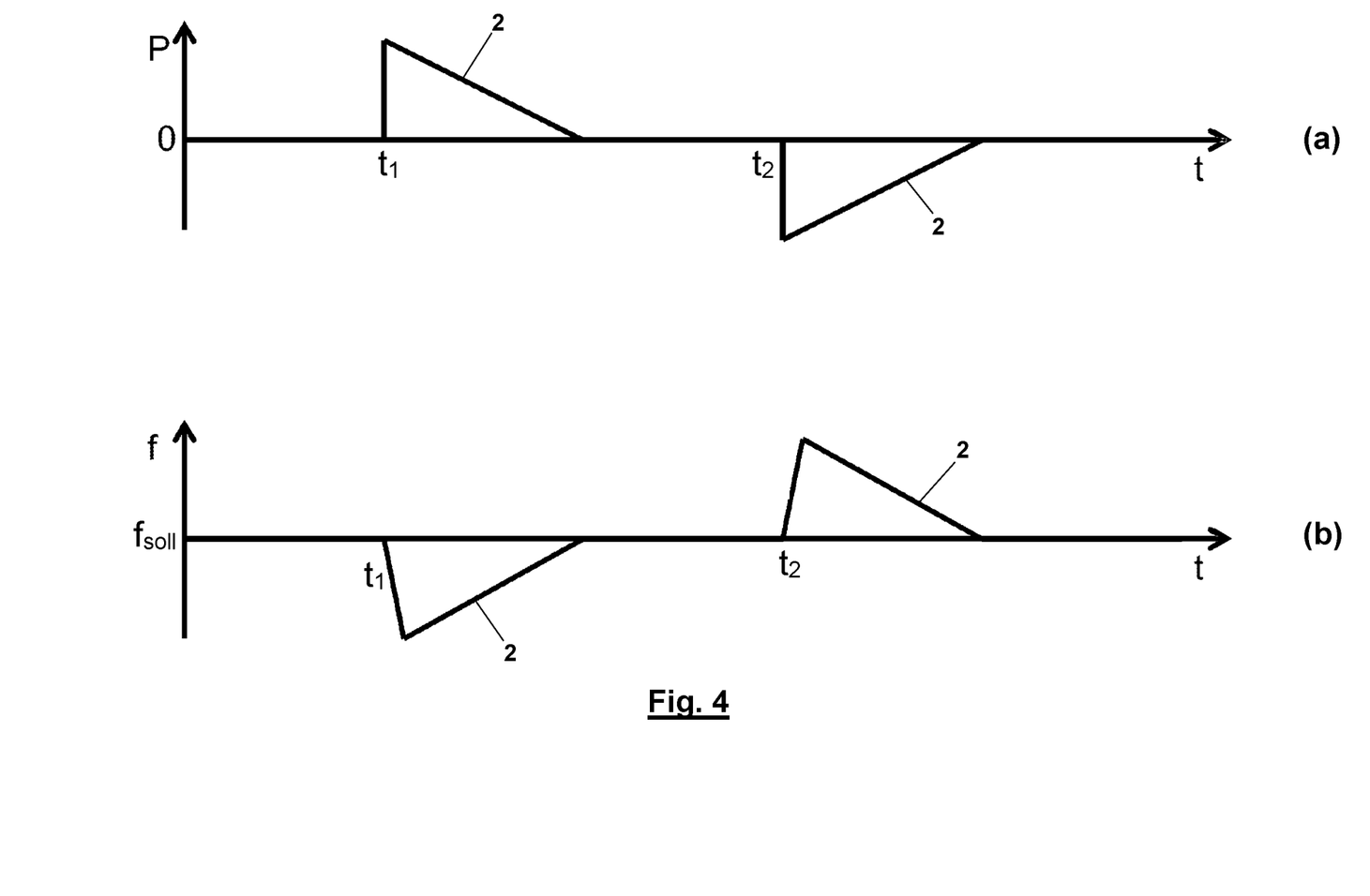
FIG. 4 shows (a) the power fed into the local AC power grid by the UPSs according to FIG. 3 (b); and (b) the resulting alteration of the frequency of the AC voltage of the local AC power grid.

FIG. 3 (a) illustrates connecting a load 5 to the AC power grid 1 at a point in time $t_1$ and disconnecting the same load at a point in time $t_2$. Due to this, the power demand of the AC power grid 1, i.e. the consumption of the electric power by the AC power grid 1, alters starting from a basic value $P_0$ at first by means of a stepwise increase at $t_1$ and then by a stepwise decrease at $t_2$ back to $P_0$. According to FIG. 3 (b), the stepwise increase as well as the stepwise decrease are at first compensated by the UPSs 2 by means of an also stepwise power output at the point in time $t_1$ and a power input at the point in time $t_2$, respectively. After $t_1$ the power output and after $t_2$ the power input, respectively, are reduced over a longer period of time over which the power provided by the gensets 6 is adapted to the additional demand or the decreasing demand of electric power by the AC power grid 1. With a dashed line, FIG. 3 (b) shows the course of the electric power of the gensets 6 which would result without the stabilization by means of the UPSs 2. This course is much steeper and nevertheless not sufficient to instantaneously completely compensate for the load 5 connected according to FIG. 3 (a). FIG. 3 (c) shows the frequency f defined by the UPSs 2 by which the course of the electric power from the gensets 6 according to FIG. 3 (b) is caused. The frequency alteration over the time is clearly reduced here, both with regard to its maximum slope or rate of alteration and its maximum value. Thus, particularly, the danger of an emergency shutoff of the gensets 6 due to a breakdown of the frequency of the AC voltage of the AC power grid 1 is avoided. Additionally, the gensets 6 are strongly protected because they are neither subjected to full load connections nor hard load rejections as they are outlined with dashed lines in FIG. 3 for that case in which the frequency f is not stabilized by the UPSs.

FIG. 4 once again, at an enlarged scale, shows the courses (a) of the electric power fed into the AC power grid 1 by the UPSs 2 and (b) the frequency f defined by the UPS 2, respectively, which have already been shown in FIGS. 3 (b) and 3 (c). At the point in time $t_1$, the UPSs 2 abruptly overtake the supply of the load 5 connected to the AC power grid 1 and transfer this supply to the gensets 6 over a longer period of time, for which end they reduce the frequency f at a limited rate of alteration until a reduction of the frequency f is achieved which corresponds to the feeding power of the UPSs 2; and they reduce this reduction of the frequency f afterwards with the increasing feeding power of the gensets 6 and the correspondingly decreasing feeding power of the UPSs 2 continuously to the desired frequency $f_{Soll}$ again. The desired frequency $f_{Soll}$ is reached again when the genset 6 has completely overtaken the supply of the connected load. Similar actions are taken upon disconnection of the load. At the point in time $t_2$, the then excess power is abruptly overtaken by the UPSs 2, and with a limited alteration of the frequency defined by the UPSs 2, the power of the gensets 6 is afterwards adapted to the altered power demand of the AC power grid 1.

Figure 5:
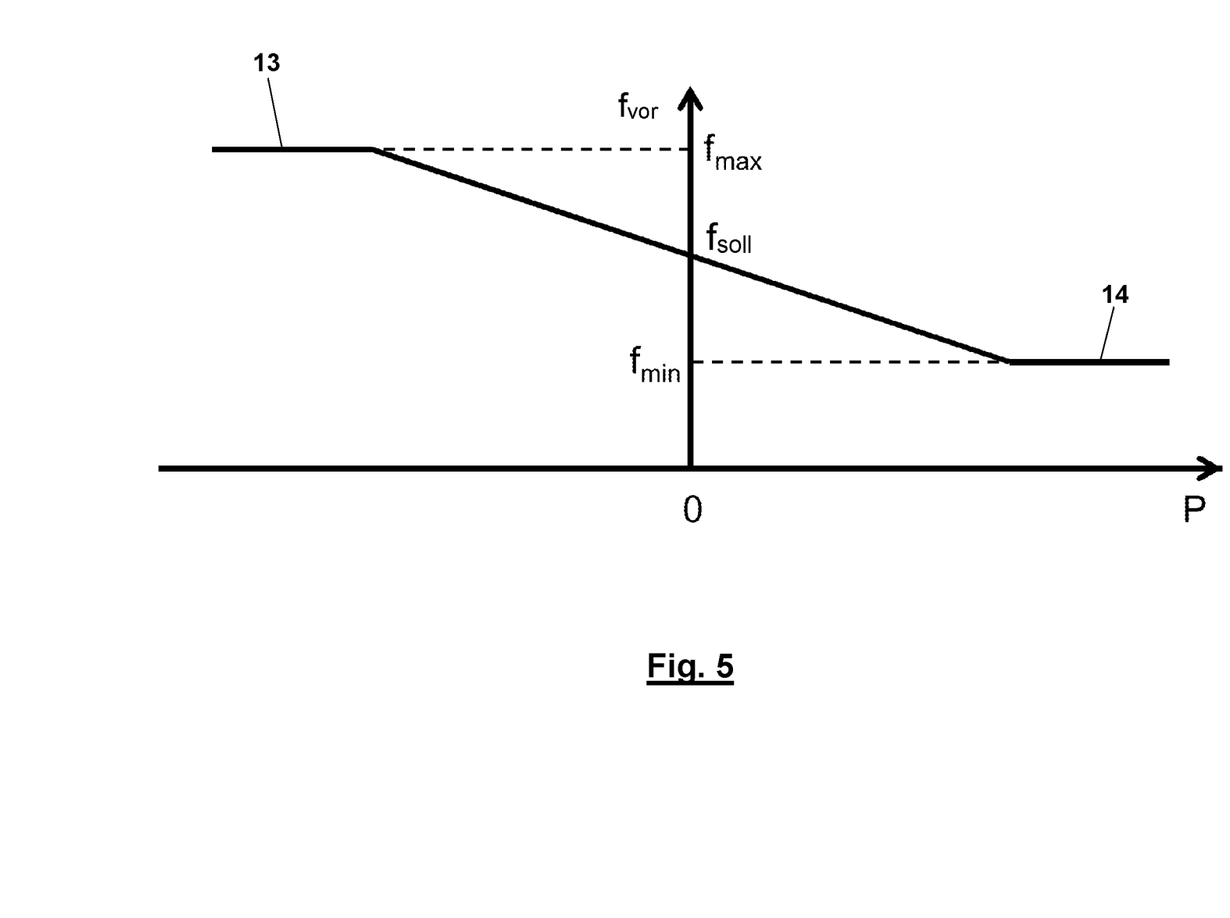
FIG. 5 shows the frequency-power-characteristic deposited in the controllers of the UPSs which leads to the behavior according to FIG. 4.

FIG. 5 shows the frequency-power-characteristic deposited in all controllers 12 of the UPSs 2. Here, the frequency $f_{vor}$ which is defined by the UPS 2 is plotted over the power P which flows out of the energy storages 15 of the UPSs 2 for balancing the power in the AC power grid 1. I.e., a positive power P corresponds to a flow of energy out of the energy storages 15, and a negative power P corresponds to a flow of energy in the energy storages 15. The characteristic depicted in FIG. 5 decreases strictly monotonic, in the present case linearly, between a plateau 13 at a maximum value $f_{max}$ of the frequency $f_{vor}$ and a plateau 14 at a minimum value $f_{min}$ of the frequency f, wherein the value f(P) according to the characteristic at a power P=0 is the desired frequency $f_{soll}$. I.e., with an output of power by the UPSs 2, the UPSs decrease the frequency $f_{vor}$ of the AC voltage of the AC power grid 1 defined by them, which is also present at the upstream gensets 6 according to FIG. 1 at their outputs until—depending on the output power P—the minimum value $f_{min}$ is reached. The rate of alteration of the frequency $f_{vor}$ is also limited which is not depicted in FIG. 5 but which may be taken from FIG. 3 (c) and FIG. 4 (b). As soon as the minimum value $f_{min}$ is reached, the frequency f is not lowered further even with an increasing power P of the UPSs 2. Vice versa, with a power input by the UPSs 2 the frequency is increased at maximum to the maximum value $f_{max}$. Here too, the rate of alteration of the frequency $f_{vor}$ is also limited.

The stabilization of the gensets 6 by the UPSs 2 according to the invention may also be described in that the UPSs 2 avoid that connected or disconnected loads 5 completely cut through to the gensets 6 in form of decreases or increases of the frequency f, which would not only considerably stress the gensets 6 but also result in considerable frequency variations of the AC voltage of the AC power grid 1. To implement this, the frequency f of the AC voltage of the AC power grid 1, which is present at the gensets 6, is fixedly defined by the UPSs 2 according to the characteristic according to FIG. 5.

Additionally, the energy stored in the energy storages 15 of the UPSs 2 can be used for supplying the AC power grid 1 until the gensets 6 are started up in case of a blackout of the higher-level supply grid 3. This bridging option with regard to the time before the gensets 6 may be fully loaded is generally known and it may be the original reason why the energy storages 15 of the UPSs 2 are provided. According to the invention, the UPSs 2 with their energy storages 15 are additionally used for stabilizing the gensets 6 and for minimizing their stress as well as for stabilizing the frequency of the AC voltage of the AC power grid 1.

Figure 6:
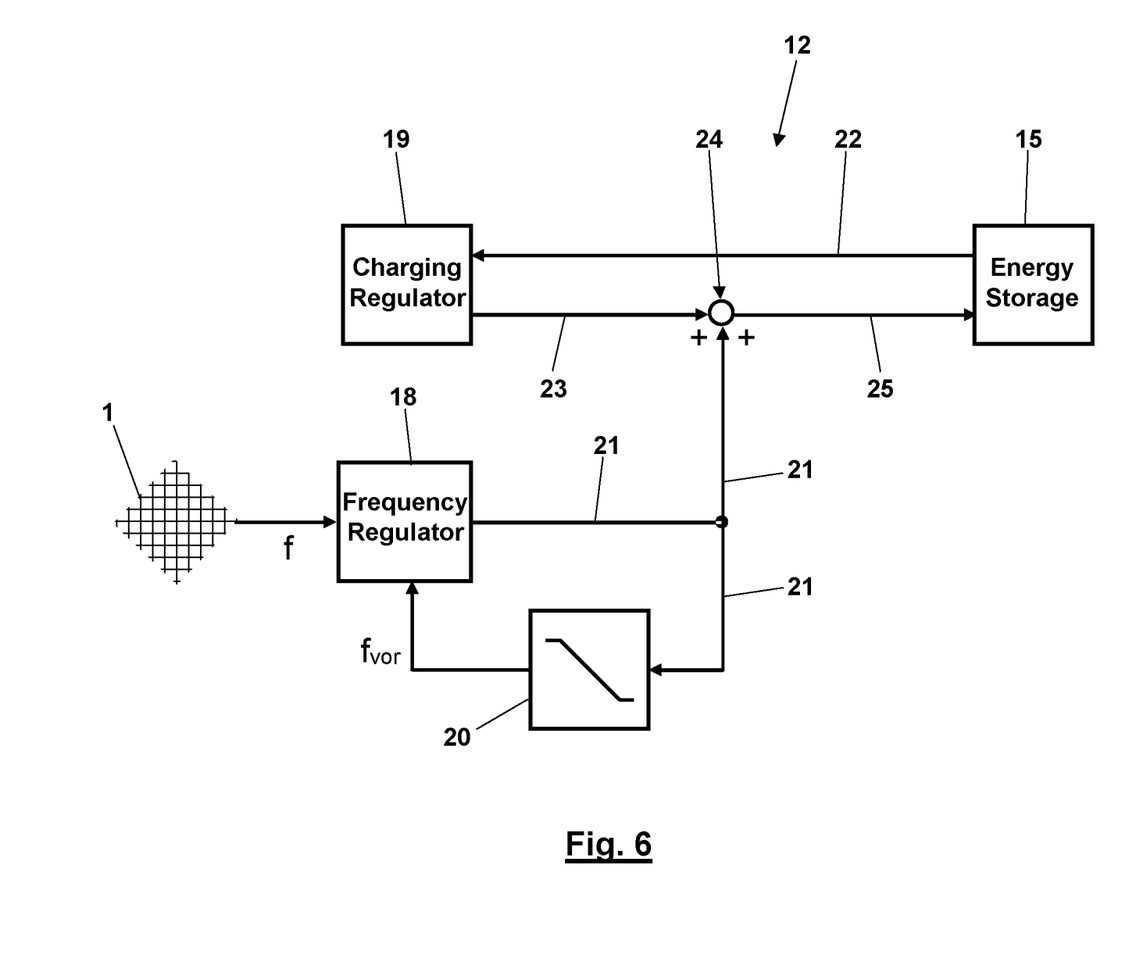
FIG. 6 outlines a possible embodiment of a controller of the UPS according to the invention.

The embodiment of the controller 12 outlined in FIG. 6 includes a frequency regulator 18 which regulates the actual frequency f of the AC voltage of the AC power grid 1 to the desired frequency $f_{vor}$ in that it outputs a desired power partial signal 21 to the energy storage 15. The desired power partial signal 21 is added by an adder 24 to a further power partial signal 23 from a charging regulator 19 to form a desired power signal 25 for the energy storage 15. The charging regulator 19 serves for keeping a desired charging state of the energy storage 15 for which purpose it monitors an actual charging state 22 of the energy storage and outputs the desired power partial signal 23 in case of occurring differences. Due to a higher time constant of the charging regulator 19 than a time constant of the frequency regulator 18 the latter one is dominant. Thus, at first only the frequency regulator 18 responds to a short-term alteration of the power in the AC power grid 1. The charging regulator only levels the actual charging state 22 of the energy storage 15 varying for this reason for longer periods of time. A frequency adjuster 20 for adjusting the desired frequency adjusts the desired frequency $f_{vor}$ on basis of the desired power partial signal 21 and using the characteristic according to FIG. 5.

Many variations and modifications may be made to the preferred embodiments of the invention without departing substantially from the spirit and principles of the invention. All such modifications and variations are intended to be included herein within the scope of the present invention, as defined by the following claims.

I claim:

1. A method of operating a local AC power grid comprising a genset which includes a combustion engine and a generator, and an uninterruptable power supply (UPS) which includes an energy storage, the method comprising
    defining a frequency of an AC voltage of the AC power grid present at the genset by means of the UPS;
    altering the frequency of the AC voltage defined by means of the UPS in one direction away from a desired frequency, if a present power demand in the AC power grid increases beyond a present power supply in the AC power grid, and altering the frequency of the AC voltage defined by means of the UPS in the other direction away from the desired frequency, if the present power demand falls below the present power supply in the AC power grid;
    with increasing power demand of the AC power grid, limiting an alteration of the frequency of the AC voltage defined by means of the UPS in the one direction to a maximum value in that missing power is temporarily fed out of the energy storage into the AC power grid;
    keeping a shift of the frequency of the AC voltage defined by means of the UPS in the one direction away from the desired frequency until no more power flows out of the energy storage into the AC power grid; and
    responding to deviations of the frequency of the AC voltage of the AC power grid from the desired frequency in one direction by an increase of a genset power supplied by means of the genset, and responding to deviations of the frequency of the AC voltage of the AC power grid from the desired frequency in the other direction by a reduction of the genset power supplied by means of the genset.

2. The method of claim 1, wherein the shift of the frequency of the AC voltage defined by means of the UPS (2) in the one direction away from the desired frequency is kept until the energy storage is recharged in a direction towards a starting charge state.

3. The method of claim 1, wherein, with decreasing power demand of the AC power grid the alteration of the frequency of the AC voltage defined by means of the UPS in the other direction is limited to another maximum value in that excess power is temporarily fed out of the AC power grid into the energy storage, wherein a shift of the frequency of the AC voltage defined by means of the UPS in the other direction away from the desired frequency is kept until no more power flows out of the AC power grid into the energy storage.

4. The method of claim 3, wherein the shift of the frequency of the AC voltage defined by means of the UPS in the other direction away from the desired frequency is kept until the energy storage is discharged in a direction towards a starting charge state.

5. The method of claim 3, wherein at least one of the maximum value and the other maximum value defines at least one of a maximum difference between the frequency of the AC voltage defined by means of the UPS and the desired frequency and a maximum rate of alteration of the AC voltage of the frequency defined by means of the UPS.

6. The method of claim 1, wherein any difference between the present power demand and the present power supply in the AC power grid is compensated for by the UPS by means of a transfer of power between the AC power grid and the energy storage, wherein the frequency of the AC voltage of the AC power grid defined by means of the UPS is adjusted to a value depending on the power transferred between the AC power grid and the energy storage.

7. The method of claim 6, wherein a characteristic of the UPS which indicates a dependency of the frequency defined by means of the UPS on the power flowing between the AC power grid and the energy storage has a steady course between a first plateau at a maximum value of the frequency defined by means of the UPS and a second plateau at a minimum value of the frequency defined by means of the UPS.

8. The method of claim 7, wherein the characteristic drops from a first power flowing in the energy storage to a second power flowing out of the energy storage.

9. Method of claim 6, wherein a value to which the frequency of the AC voltage of the AC power grid defined by means of the UPS is adjusted is further dependent on a difference between a charge state of the energy storage and its starting charge state.

10. An uninterruptable power supply (UPS) for operating a local AC power grid which, besides the UPS, comprises a genset including a combustion engine and a generator, the UPS comprising
an energy storage,
at least one connection for integrating the UPS in the AC power grid and for connecting the genset to the UPS, and
a controller which is configured to control the UPS such that the UPS
defines a frequency of an AC voltage of the AC power grid, which is present at the connection for the genset,
alters the frequency of the AC voltage in one direction from a desired frequency of the AC voltage, if a present power demand in the AC power grid increases beyond a present power supply in the AC power grid, and
alters the frequency of the AC voltage in the other direction, if the present power demand falls below the present power supply in the AC power grid,
wherein the controller is configured to limit the alteration of the frequency of the AC voltage in the one direction to a maximum value, when the power demand of the AC power grid increases, in that it controls the UPS such that the UPS temporarily feeds missing power out of the energy storage into the AC power grid, and
wherein the controller is configured to control the UPS such that the UPS keeps the frequency of the AC voltage shifted with regard to the desired frequency in the one direction away from the desired frequency until no more power flows out of the energy storage into the AC power grid.

11. The UPS of claim 10, wherein the controller is configured to control the UPS such that the UPS keeps the frequency of the AC voltage shifted in the one direction away from the desired frequency until the energy storage has reached a starting charge state again.

12. The UPS of claim 10, wherein the controller is configured to limit the alteration of the frequency of the AC voltage in the other direction to another maximum value, when the power demand of the AC power grid decreases, in that it controls the UPS such that the UPS temporarily feeds excess power out of the AC power grid into the energy storage, wherein the controller is configured to control the UPS such that the UPS keeps the alteration of the frequency of the AC voltage shifted in the other direction away from the desired frequency until no more power flows out of the AC power grid into the energy storage.

13. The UPS of claim 12, wherein the controller is configured to control the UPS such that the UPS keeps the frequency of the AC voltage shifted in the other direction away from the desired frequency until the energy storage has reached a starting charge state again.

14. The UPS of claim 12, wherein at least one of the maximum value and the other maximum value defines at least one of a maximum difference between the frequency of the AC voltage and the desired frequency and a maximum rate of alteration of the frequency of the AC voltage.

15. The UPS of claim 10, wherein the controller is configured to control the UPS such that the UPS compensates for any difference between the present power demand and the present power supply in the AC power grid by a transfer of power between the AC power grid and the energy storage.

16. The UPS of claim 15, wherein the controller is configured to control the UPS such that the UPS adjusts the frequency of the AC voltage of the AC power grid to a value depending on the power flowing between the AC power grid and the AC storage.

17. The UPS of claim 16, wherein a characteristic indicating a dependency of the frequency defined by means of the UPS on the power flowing between the AC power grid and the energy storage has a steady course between a first plateau at a maximum value of the frequency defined by means of the UPS and a second plateau at a minimum value of the frequency defined by means of the UPS and drops strictly monotonically.

18. The UPS of claim 17, wherein the characteristic drops from a first power flowing in the energy storage to a second power flowing out of the energy storage.

19. The UPS of claim 10, wherein the controller is configured such that the value to which the UPS adjusts the frequency of the AC voltage is further dependent on a difference between a charge state and a starting charge state of the energy storage.

20. The UPS of claim 10, wherein the controller comprises
a frequency regulator for the frequency of the AC voltage defined by means of the UPS, wherein the frequency regulator outputs a first desired power partial signal,
a charging regulator configured to keep a predetermined charge state of the energy storage, wherein the charge regulator outputs a second desired power partial signal and wherein the charging regulator has a higher time constant than the frequency regulator,
an adder which adds the first desired power partial signal and a second desired power partial signal to form a desired power signal for the energy storage, and
a frequency adjuster configured to adjust the frequency defined by means of the UPS on basis of the first desired power partial signal.

* * * * *